United States Patent [19]
Drake, Jr. et al.

[11] Patent Number: 6,094,687
[45] Date of Patent: Jul. 25, 2000

[54] SYSTEM AND METHOD FOR CONNECTING SOURCE NODES AND DESTINATION NODES REGARDING EFFICIENT QUALITY OF SERVICES ROUTE DETERMINATION USING CONNECTION PROFILES

[75] Inventors: John E. Drake, Jr., Pittsburgh; Anix Anbiah, Cranberry; Theodore Ernest Tedijanto, Wexford, all of Pa.; Antoni B. Przygienda, Rockville, Md.

[73] Assignee: FORE Systems, Inc., Warrendale, Pa.

[21] Appl. No.: 09/008,406

[22] Filed: Jan. 17, 1998

[51] Int. Cl.[7] .................................................. G06F 13/00
[52] U.S. Cl. .............................................................. 709/241
[58] Field of Search ........................ 364/DIG. 1 MS File; 370/60, 238; 709/200, 218, 219, 220, 221, 222, 223, 227, 228, 232, 235, 238, 239, 241

[56] References Cited

U.S. PATENT DOCUMENTS 5,317,566  5/1994  Joshi ........................................ 370/60

*Primary Examiner*—Robert B. Harrell
*Attorney, Agent, or Firm*—Ansel M. Schwartz

[57] ABSTRACT

A system for connecting source nodes and destination nodes. The system includes an ATM network along which ATM cells travel. The system includes source nodes connected to the ATM network which produce ATM cells that travel along the ATM network. The system includes destination nodes connected to the ATM network which receive ATM cells from the ATM network. The system also includes a switching mechanism connected to the ATM network for directing an ATM cell from a first source node of the source nodes to a first destination node of the destination nodes. The switch mechanism has a mechanism for holding predetermined connection profiles between source nodes and destination nodes. The switch mechanism connects the first source node to the first destination node based on a desired connection profile from the holding mechanism after the first source node makes a request on the switch mechanism to be connected with the first destination node. A method for connecting source nodes and destination nodes. The method includes the steps of predetermining connection profiles between source nodes and destination nodes.

19 Claims, 3 Drawing Sheets

SYSTEM AND METHOD FOR CONNECTING SOURCE NODES AND DESTINATION NODES REGARDING EFFICIENT QUALITY OF SERVICES ROUTE DETERMINATION USING CONNECTION PROFILES

FIELD OF THE INVENTION

The present invention is related to connecting source nodes and destination nodes. More specifically, the present invention is related to connecting source nodes and destination nodes using predetermined connection profiles.

BACKGROUND OF THE INVENTION

For a network that guarantees quality of service (QoS) to individual connections, route determination is both a crucial component and a challenging problem. In such a network (e.g. an Asynchronous Transfer Mode, or ATM, network), data packets or cells belonging to a given connection follow a pre-established route across the network. For each connection, the chosen route is determined in such a way that the connection is guaranteed to receive the negotiated quality of service from each switching device along the route for the duration of the connection's existence.

The state-of-the-art QoS routing protocol currently available in the networking industry is a protocol developed by the ATM Forum called Private Network-Network Interface or PNNI [The ATM Forum, ATM Private Network-Network Interface Specification v. 1.0, April 1996, incorporated by reference herein]. PNNI routing protocol specifies what and how QoS information is exchanged among switching devices in the network. Each switching device originating a connection determines a route based on this information. Generally, computing a route satisfying a given set of QoS requirements boils down to a constrained optimization problem, which cannot be solved exactly in real time. The ATM Forum recognized this and left route determination unspecified in the PNNI specification, giving vendors freedom to experiment with and implement their own algorithms without breaking the protocol.

In a connection-oriented network such as ATM, connection setup rate is a very important performance parameter. The ability of such a network to support layer-3 protocols (such as Internet Protocol or IP) over it efficiently is very much dependent on being able to deliver sufficiently high connection setup rates. Route determination time constitutes a relatively large portion of connection setup latency, and therefore needs to be kept as small as possible.

PNNI is likely to become one of the most widely deployed routing protocols supporting QoS in the networking industry. Because route determination is not standardized, it represents one of the key differentiators among different networking vendors' PNNI implementations.

The present invention solves the QoS route determination problem by combining these two elements 1) approximate/heuristic (as opposed to exact) solutions to the constrained optimization problem and 2) route precomputation based on connection profiles. The contribution of the invention is in identifying what parameters are relevant in defining a profile and what information needs to be pre-computed to support the approximate solution, and in combining all the elements into an implementable algorithm.

SUMMARY OF THE INVENTION

The present invention pertains to a system for connecting source nodes and destination nodes. The system comprises an ATM network along which ATM cells travel. The system comprises source nodes connected to the ATM network which produce ATM cells that travel along the ATM network. The system comprises destination nodes connected to the ATM network which receive ATM cells from the ATM network. The system also comprises a switching mechanism connected to the ATM network for directing an ATM cell from a first source node of the source nodes to a first destination node of the destination nodes. The switch mechanism has a mechanism for holding predetermined connection profiles between source nodes and destination nodes. The switch mechanism connects the first source node to the first destination node based on a desired connection profile from the holding mechanism after the first source node makes a request on the switch mechanism to be connected with the first destination node.

The present invention pertains to a method for connecting source nodes and destination nodes. The method comprises the steps of predetermining connection profiles between source nodes and destination nodes. Then there is the step of requesting a first connection from a first source node of the source nodes be formed with a first destination node of the destination nodes. Next there is the step of finding a first connection profile of the predetermined connection profiles which corresponds with the first connection. Then there is the step of forming the first connection between the first source node and the first destination node based on the first connection profile.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
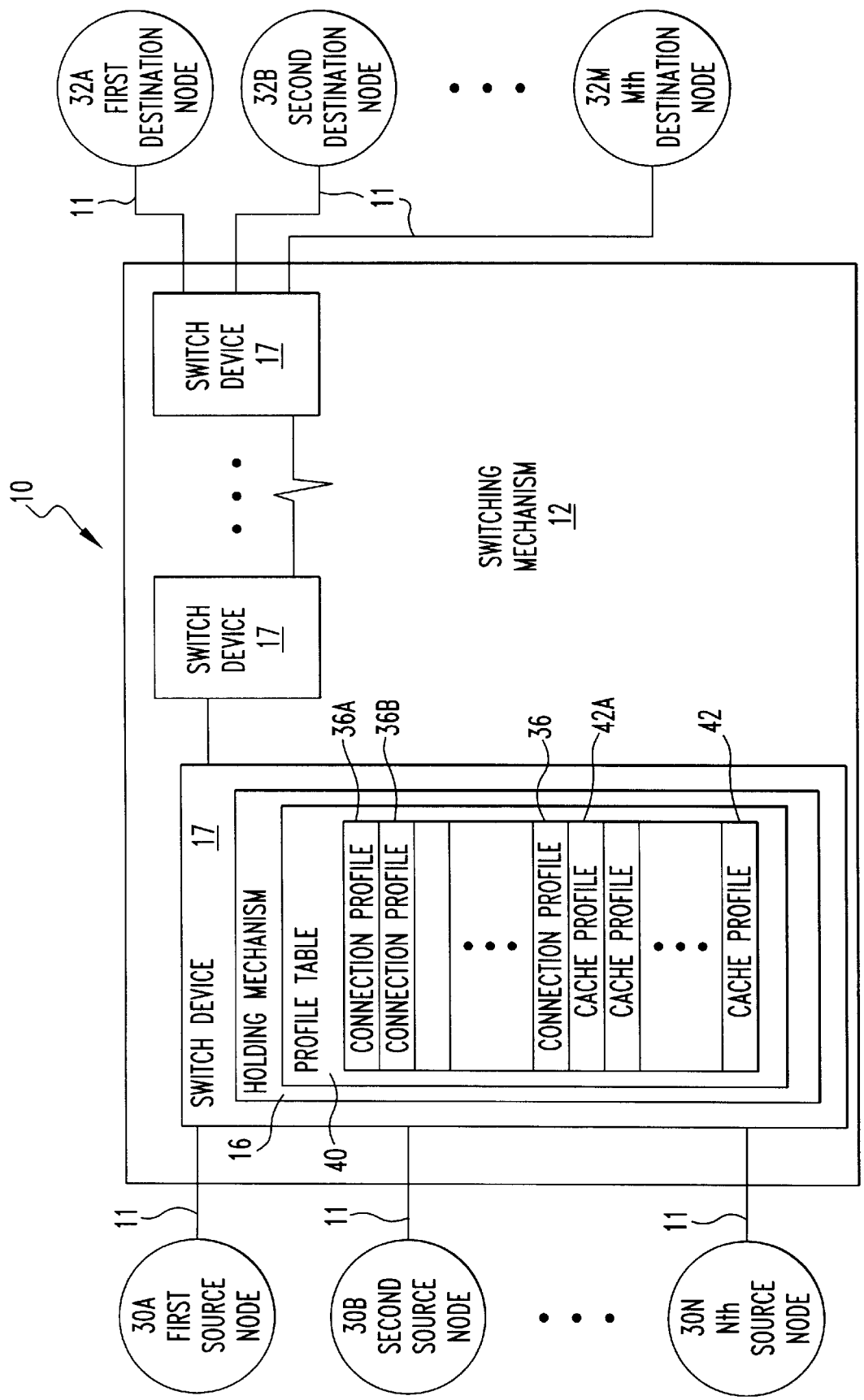
FIG. 1 is a schematic representation of a system for directing source Nodes and destination nodes of the present invention.

Referring now to the drawings wherein like reference numerals refer to similar or identical parts throughout the several views, and more specifically to FIG. 1 thereof, there is shown a system 10 for connecting source nodes 30 and destination nodes 32. The system 10 comprises an ATM network 11 along which ATM cells travel. The system 10 comprises source nodes 30 connected to the ATM network 11 which produce ATM cells that travel along the ATM network 11. The system 10 comprises destination nodes 32 connected to the ATM network 11 which receive ATM cells from the ATM network 11. The system 10 also comprises a switching mechanism 12 connected to the ATM network 11 for directing an ATM cell from a first source node 30a of the source nodes 30 to a first destination node 32a of the destination nodes 32. The switch mechanism 12 has a mechanism 16 for holding predetermined connection profiles 36 between source nodes 30 and destination nodes 32. The switch mechanism 12 connects the first source node 30a to the first destination node 32a based on a desired connection profile 36 from the holding mechanism 16 after the first source node 30a makes a request on the switch mechanism 12 to be connected with the first destination node 32a.

Figure 2:
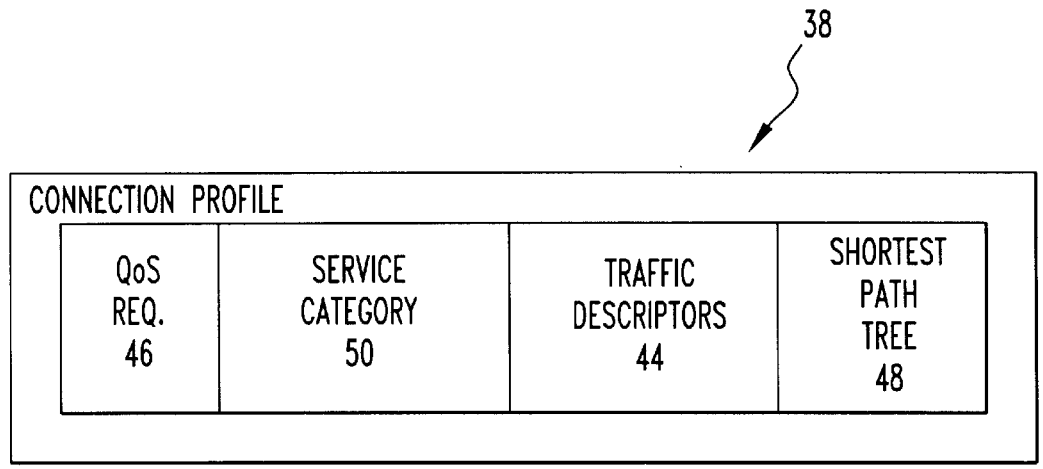
FIG. 2 is a schematic representation of a connection profile.
Figure 3:
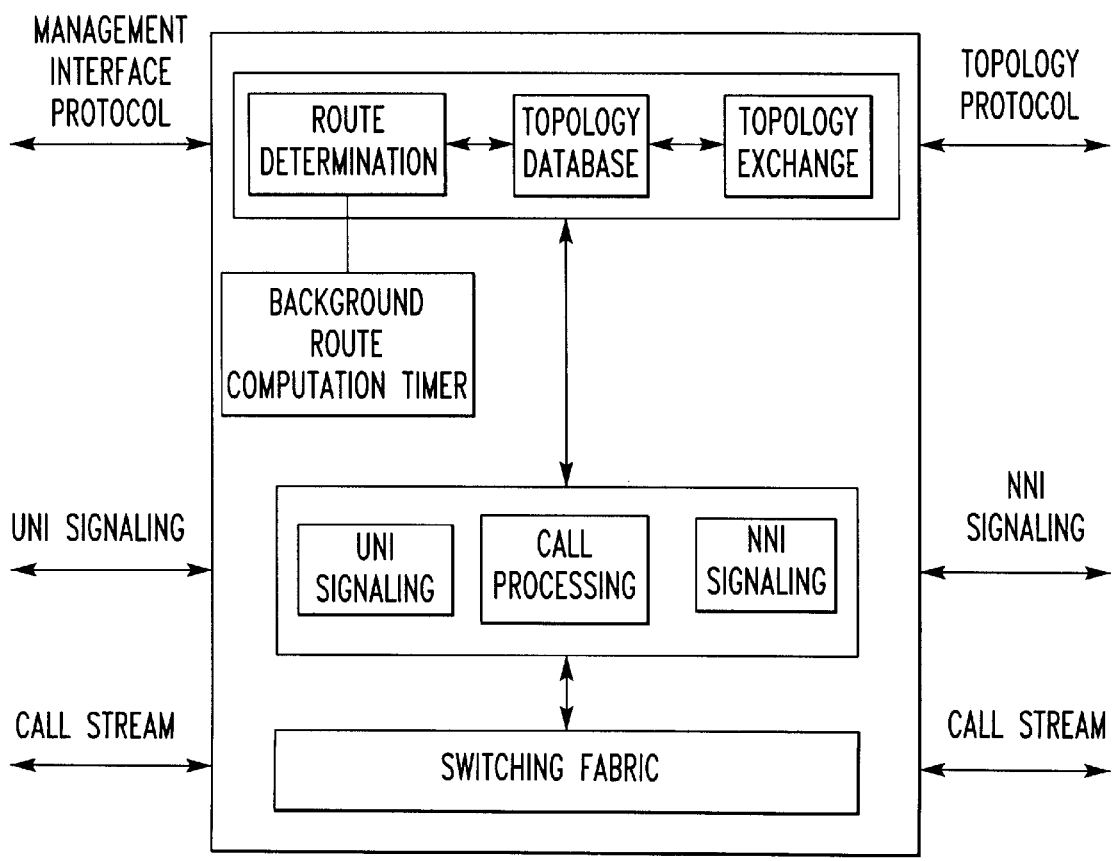
FIG. 3 is a schematic representation of a switching device of the present invention.

The switch mechanism 12 preferably includes a switching device 14, which has the holding mechanism 16 disposed on it. The holding mechanism 16 preferably includes a profile table 40 in which the connection profiles 36 are stored. The profile table 34 preferably includes at least a first cache profile 42 formed from a connection that does not have a connection profile 36 in the profile table 40. Preferably, each connection profile 36 includes a service category 50, QoS parameters 46, traffic descriptors 44 and a shortest path tree 48, as shown in FIG. 2. The structure of the switching device 14 is consistent with PNNI guidelines. Except for the route determination request, whose operation and effect is described herein, the remaining portion of the switching device's operation is well known to one skilled in the art as defined by the PNNI guidelines, incorporated by reference, herein. See FIG. 3, which shows a schematic representation of the switching device 14.

Figure 4:
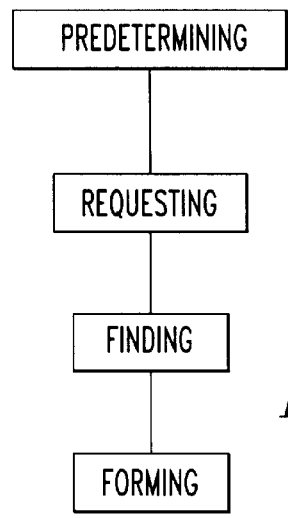
FIG. 4 is a flow chart of the method of the present invention.

The present invention pertains to a method for connecting source nodes 30 and destination nodes 32, as shown in FIG. 1 and FIGS. 1, 2 and 4. The method comprises the steps of predetermining connection profiles 36 between source nodes 30 and destination nodes 32. Then there is the step of requesting a first connection from a first source node 30a of the source nodes 30 be formed with a first destination node 32a of the destination nodes 32. Next there is the step of finding a first connection profile 34a of the predetermined connection profiles 36 which corresponds with the first connection. Then there is the step of forming the first connection between the first source node 30a and the first destination node 32a based on the first connection profile 34a.

Preferably, the predetermining step includes the steps of creating a first connection profile 34a having route information 38 for connecting the first source node 30a with the first destination node 32a, and storing the first connection profile 36a in a profile table 40. Preferably, the predetermining step includes the steps of creating a second connection profile 36b having route information 38 for connecting a second source node 30b with a second destination node 32b, and storing the second connection profile 36b in the profile table 40. The predetermining step preferably includes the steps of creating N additional connection profiles 36, where N is an integer greater than or equal to 1, having route information 38 for connecting N source nodes 30 with N destination nodes 32, respectively. Then there is the step of storing the N additional connection profiles 36 in the profile table 40.

The finding step preferably includes the step of choosing the first connection profile 36a from the profile table 40 for route information 38 for connecting the first source node 30a and the first destination method 32a. Preferably, the forming step includes the step of forming the first connection between the first source node 30a and the first destination node 32a based on the route information 38 in the first connection profile 36a. The step of creating the first connection profile 36a preferably includes the step of creating the first connection profile 36a having a set of parameters that described the first connection's traffic characteristics 44 and QoS requirements 46. The step of creating a first connection profile 34a preferably includes the step of defining a shortest path tree 48 associated with the first connection. Preferably, after the step of creating the first connection profile 34a, there is the step of re-creating the first connection profile 34a after a predetermined period of time.

Preferably, after the forming step, there is the step of creating a first cache profile 42a from a connection that does not have a corresponding connection profile 36 in the profile table 40. Preferably, after the creating a first cache profile 42a, there are the steps of creating M additional cache profiles 42 from M respective connections that do not have corresponding connection profiles 36 in the profile table, where M≧1 and is an integer.

Figure 5:
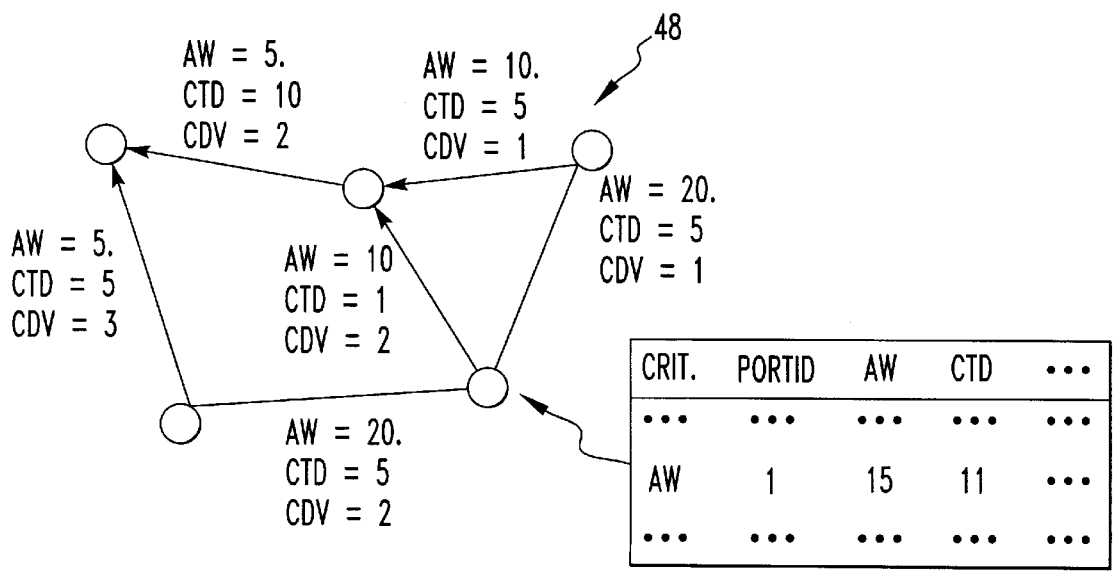
FIG. 5 is a schematic representation of a shortest path tree.

The choosing step preferably includes the step of searching the connection profiles 36 and the cache profiles 42 of the profile table 40 for the first connection profile 34a which satisfies the requirements of the first connection. The searching step preferably includes the steps of determining that the first connection profile 34a has a service category 50 which matches the service category 50 of the first connection. Then there is the step of determining that the first connection profile 34a meets load balancing and PVC only restrictions of the first connection. Preferably, the searching step includes the steps of determining that the last leg 52 of the shortest path tree 48 of the first connection profile 34a meets CLR, CDV, bandwidth and VP requirements of the first connection, as shown in FIG. 5. Next there is the step of determining that the remaining portions 54 of the shortest path tree 48 of be first connection profile 36a meets CLR, CDV, bandwidth and CTD requirements of the first connection.

The step of creating a first cache profile 42a preferably includes the steps of examining each of the connection profiles 36 in the profile table 40 and not finding that any of the connection profiles 36 match the service category 50, QoS requirements 46 and traffic descriptors 44 of the connection. Next there is the step of invalidating the oldest in time cache profile 42 of the M cache profiles 42. Then there is the step of replacing the oldest in time cache profile 42 with a new cache profile 42 that corresponds to the connection.

In the operation of the preferred embodiment, the route determination algorithm being described here works for a generic network supporting quality of service. But, for the sake of clarity, an ATM network 11 is used as representative of a network supporting QoS.

In an ATM network 11, each connection belongs to a service category 50. A connection's service category 50 determines how the network treats the connection based on its traffic characteristics 44 and QoS requirements 46. Network functions such as routing, connection admission control (CAC) and resource allocation are structured differently for each service category 50. The following service categories 50 are defined in ATM (see [The ATM Forum, ATM Traffic Management Specification v4.0, April 1996, incorporated by reference herein] for details):

1. Constant bit rate (CBR)
2. Real-time variable bit rate (rt-VBR)
3. Nonreal-time variable bit rate (nrt-VBR)
4. Unspecified bit rate (UBR)
5. Available bit rate (ABR)

Quality of service are specified using a set of parameters. The following QoS parameters 46 are defined in ATM:

1. Maximum cell transfer delay (maxCTD): a measure of how much delay is incurred by a cell traversing the route from end to end.

2. Peak-to-peak cell delay variation (CDV): a measure of how much variation in the delay is incurred by a cell traversing the route from end to end.

3. Cell loss ratio (CLR0): a measure of what fraction of the cells traversing the route fails to reach the destination for cells with CLP bit set to 0.

4. Cell loss ratio (CLR1): a measure of what fraction of the cells traversing the route fails to reach the destination for cells with CLP bit set to 1.

A connection's traffic characteristics are specified using a set of traffic descriptors 44. The following traffic descriptor parameters are defined in ATM:

1. Peak cell rate (PCR)
2. Sustainable cell rate (SCR)
3. Maximum burst size (MBS)

CBR Service Category

CBR service category is used by connections with bandwidth that is constant during their lifetime. The amount of bandwidth is specified by the PCR value. This service category is intended for real-time applications that require tight maxCTD, CDV and CLR constraints. The route chosen to support a CBR connection must satisfy the following requirements:

1. All links along the route must have enough available capacity (cell rate) to support the connection's bandwidth requirement.
2. End-to-end maxCTD, CDV and CLR must be within the maximum values specified for the connection.

rt-VBR Service Category rt-VBR service category is used by connections with bandwidth that may fluctuate during their lifetime. The amount of bandwidth is specified by the PCR, SCR and MBS values. This service category is intended for real-time applications that require tight maxCTD, CDV and CLR constraints. The route chosen to support a rt-VBR connection must satisfy the following requirements:

1. All links along the route must have enough available capacity (cell rate) to support the connection's bandwidth requirement.
2. End-to-end maxCTD, CDV and CLR must be within the maximum values specified for the connection.

nrt-VBR Service Category nrt-VBR service category is used by connections with bandwidth that may fluctuate during their lifetime. The amount of bandwidth is specified by the PCR, SCR and MBS values. This service category is intended for nonreal-time applications that do not have maxCTD and CDV constraints, but may expect a low CLR. The route chosen to support a nrt-VBR connection must satisfy the following requirements:

1. All links along the route must have enough available capacity (cell rate) to support the connection's bandwidth requirement.
2. End-to-end CLR must be within the maximum value specified for the connection.

UBR Service Category

UBR service category does not specify any quality of service guarantee. This service category is intended for nonreal-time applications that do not have delay nor CLR constraints. A PCR value is specified for a UBR connection, but the network may or may not use it for CAC purposes. For this invention disclosure, we consider the case where PCR is used in CAC. The route chosen to support a UBR connection must satisfy the following requirement:

1. All links along the route must have enough maximum capacity (cell rate) to support the connection's PCR.

ABR Service Category

ABR service category provide quality of service that may change throughout the life of the connection. A flow-control mechanism is specified to control the source rate in response to changing network conditions. This service category is intended for nonreal-time applications that do not have delay nor CLR constraints. A minimum cell rate (MCR) value is specified for an ABR connection. The route chosen to support a UBR connection must satisfy the following requirement:

1. All links along the route must have enough available capacity (cell rate) to support the connection's MCR.

Quality of Service Routing

There are potentially a number of ways a routing protocol can support QoS. In PNNI, every switching device in the network pre-sets for every link attached to it what service categories are supported and what QoS parameter values can be guaranteed for each service category supported. This information is then exchanged among all the switching devices 14 in the network using a mechanism provided by PNNI, as is well known in the art.

Using PNNI, every switching device 14 in the network 11 has a view of the network in the form of a graph with switching devices 14 as node (vertices) and links as unidirectional edges. Each edge has a number of service categories associated with it, and each service category categories (whenever appropriate) has maxCTD, CDV, CLR, maximum cell rate (maxCR0, maxCLR1), available cell rate (ACR), administrative weight (AW) and other attributes associate with it.

A route is composed of series of links connecting a source node and a destination node. End-to-end max-CTD and CDV are computed as arithmetic sums of maxCTD and CDV values, respectively, associated with the edges composing the route. End-to-end CLR (either 0 or 1) Is computed as the maximum CLR value among those associated with the edges composing the route.

Administrative weight is a value that a network operator assigns to a given link. A link with a larger AW value is less desirable for inclusion in a route than that with a smaller value. End-to-end AW is computed as the arithmetic sum of the composing edges' AW values. Route computation tries to minimize end-to-end AW whenever possible.

Pre-computation vs. On-Demand Computation

Route determination for CBR and rt-VBR service categories is a complicated problem because of the requirement to support QoS. Supporting QoS means:

Constrained shortest path route computation:

Route computation needs to find a route that minimizes Administrative Weight (AW) subject to bandwidth, end-to-end maxCTD, CDV and CLRx requirements. It is well-known to be a NP-complete problem in case of optimization of multiple additive quantities. In such situations, heuristic algorithms are used, which can be performed in real time but may be sub-optimal. Even with heuristic algorithms, on-demand computation may not accommodate a high setup request rate.

Pre-computing routes for all possible requests is infeasible:

Because the number of all best possible combinations of QoS can be large, both the memory and processing costs of precomputing routes for all possible setup requests are likely to be unacceptable although highly efficient algorithms therefore are known.

To meet both high setup rate requirement and memory/processing constraints, a combination of pre-computation and on-demand computation is used.

The method and system 10 provides an efficient way for supporting QoS routing using the notion of connection profiles 36. A connection profile 36 is a set of parameters that describe a connection's traffic characteristics and QoS requirements 46. For each connection profile 36, appropriate route information is pre-computed and stored.

A profile table 40 is used to store a pre-determined maximum number of connection profiles 36. Of this maximum number of profiles 34, a pre-determined number is reserved for configured profiles; the rest for cached profiles 42. A configured profile is a profile that is defined and created by the network operator through network management. Cached profiles 42 are used to store the last setup requests for which no appropriate configured profiles are available. Routes are precomputed periodically for all the profiles. As newer PNNI information is received, a profile may get invalidated. Route information for invalidated profiles are re-computed when either a setup matching the profile is requested or when the periodic background route computation timer for the profile fires, whichever comes first.

What route information is pre-computed and stored depends on the profile. In general, this information is in the form of one or more shortest path trees 48 (SPT's), each computed using the well-known Dijkstra algorithm [E. W. Dijkstra, "A Note on Two Problems in Connexion with Graphs," Numerische Mathematik 1 (1959), pp. 269–271, incorporated by reference herein]. When a connection request is received, the entire profile table 40 is searched to find a profile (may be either a configured or a cached profile) that satisfies the requested connection's requirements. If multiple such profiles are found, first profile that matches the request is selected. The route for the requested connection is then determined from the route information stored for the selected profile. If no profile satisfying the requested connection's requirements is found, a cached profile is created based on the connection's characteristics. This newly created profile is placed on the profile table, possibly replacing an old cached profile. The route for the requested connection is then determined based on the route information computed for the newly created cached profile.

Heuristic Solution to Constrained Optimization Problem

For CBR and rt-VBR service categories, route computation is a constrained optimization problem, which is known to be an NP-complete problem, i.e., the time and space it takes to compute the exact solution increase with the number of nodes in the graph at an unacceptable rate. A number of heuristic solutions have been published; see [L. Ford and D. Fulkerson, Flows in Networks. Princeton University Press, 1962; A. Przygienda, 'Route Pre-Computation Algorithm for Integrated Services Network', Journal of Networks and System Management, 1995; R. Guerin et al., "Methods and Apparatus for Optimum Path Selection in Packet Transmission Networks," U.S. Pat. No. 5,233,604, August 1993; J. Jaffe, "Algorithms for Finding Paths with Multiple Constraints," Networks 14, 1984; W. Lee et al., "Multi-Criteria Routing Subject to Resource and Performance Constraints," ATM Forum Contribution ATMF/94-0280, March 1994; W. Lee et al., "Rule-Based Call-by-Call Source Routing for Integrated Communication Networks," Proc. of IEEE INFOCOM '93, March 1993; T. E. Tedijanto et al., "NBBS Path Selection Framework," IBM Systems Journal 34(4), 1995, pp. 629–639, incorporated by reference herein] and the references therein. This invention uses a special case of the method proposed in [W. Lee et al., "Multi-Criteria Routing Subject to Resource and Performance Constraints," ATM Forum Contribution ATMF/94-0280, March 1994, incorporated by reference herein] called fallback method. Using this method, route computation basically falls back to less and less stringent optimization criteria and/or constraints. A consequence of using this method is that three shortest path trees 48 need to be pre-computed for each CBR or rt-VBR profile: 1) shortest path tree that minimizes administrative weight (AW SPT), 2) shortest path tree 48 that minimizes cell transfer delay (CTD SPT) and 3) shortest path tree that minimizes cell delay variation (CDV SPT).

A connection profile 36 is defined by the following parameters:

| | |
|---|---|
| 1. | Destination node |
| 2. | Connection characteristics: |
| | - Service category |
| | - Maximum CLRx (MaxCLRx) |
| | - Minimum forward cell rate (FwdCR) |
| | - Minimum reverse cell (RevCR) |
| | - Other attributes |
| 3. | Load balancing flag (if service category is UBR or ABR) |
| 4. | Shortest path trees to be computed: |
| | - CTD, CDV and/or AW (only one is allowed if service category is UBR or ABR) |

Source and Destination Nodes

The source and destination nodes for the profile. Normally, source is set to the "local" node and destination is set to NULL to indicate that the profile is intended for all the nodes in the network.

Connection Characteristics

Service category: CBR, rt-VBR, nrt-VBR, UBR or ABR

MaxCLRx: the negative exponent of the maximum acceptable CLRx; for example, maxCLRx=8 to indicate maximum acceptable CLRx of 10-8; applies only if service category is CBR or rt-VBR FwdCR: bandwidth required in the forward direction of the connection in cells/second; for CBR, rt-VBR and nrt-VBR service categories, it is computed using the simple GCAC described in Section 5.13.4.3 of [The ATM Forum, ATM Private Network-Network Interface Specification v. 1.0, April 1996, incorporated by reference herein]; for UBR service category, it is set to the specified PCR; for ABR service category, it is set to the specified MCR RevCR: like MinFwdCR but for the reverse direction of the connection Other attributes: additional characteristics of the connection such as whether the connection is a virtual path (VP) connection Shortest Path Trees To Be Computed A shortest path tree 48 based on AW is always computed for each profile. If the profile's service category is CBR or rt-VBR, this parameter determines what additional shortest path trees 48 (CTD and/or CDV) are to be computed for the given profile.

Load Balancing Flag

This parameter applies only if the service category is UBR or ABR and indicates whether load balancing is to be performed for the profile.

Profile Table

Configured and cached profiles are stored in a profile table. The following is a sample profile table:

TABLE 1

Profile Table

| # | Type | Source/ Dest | Svc Cat | Fwd $CLR_x$ CR | Rev CR | Other Attrs | SPTs | Load Bal. | Valid |
|---|------|--------------|---------|---------|--------|-------------|------|-----------|-------|
| 1 | conf | nd1/- | ubr | — pcr1 | pcr2 | — | CTD | yes | yes |
| 2 | conf | nd1/- | abr | — mcr1 | mcr2 | — | AW | yes | yes |
| 3 | conf | nd1/- | cbr | clr1 cr1 | cr2 | — | CDV, AW | — | no |
| 4 | conf | nd1/- | rt-vbr | clr2 cr3 | cr4 | VP | CTD, AW | — | yes |
| . . | | | | | | | | | |
| 8 | cache | nd1/nd2 | rt-vbr | clr3 cr5 | cr6 | — | CDV | — | yes |
| 9 | cache | nd1/nd3 | nrt-vbr | — cr7 | cr8 | — | AW | — | yes |

Invalidating Profile Table 40 Entries

When PNNI routing information containing a link is received, the node corresponding to the originator of the information is looked up. For each shortest path tree that the link is part of, the corresponding profile is checked. If the newly received information carries a change to a topology parameter that the profile uses as a constraint and the change results in the constraint being violated, then the profile is invalidated. A change to AW and/or CTD (except for UBR and ABR) also invalidates the profile.

Shortest Path Trees 48

For each profile, Dijkstra algorithm is used to compute one or more shortest path trees (SPT's). SPT's are precomputed periodically. As newer PNNI information is received, a profile may get invalidated, in which case the SPT's are re-computed when either a setup matching the profile is requested or when the periodic background route computation timer for the profile fires, whichever comes earlier.

Computing SPT's

The following are how SPT's are computed depending on the profile's parameters.

Source and Destination Nodes

If destination is set, SPT's are computed only up to the destination node. Otherwise, SPT's are computed to reach all nodes in the network.

Connection Characteristics

Connection characteristics are translated into link constraints. A link constraint is a condition that a link must meet for it to be included for consideration. Link constraints are used to "trim" the network graph used in the Dijkstra computation of the SPT's.

1. Service category: the link must support the service category in both directions
2. CLRX: the link's CLRx value for the given service category in both directions must be smaller than the profile's CLRx
3. FwdCR:
   For UBR service category, the link's maximum cell rate must be larger than the profile's FwdCR
   For other service categories, the link's available cell rate must be larger than the profile's FwdCR
4. RevCR:
   For UBR service category, the reverse link's maximum cell rate must be larger than the profile's RevCR
   For other service categories, the reverse link's available cell rate must be larger than the profile's RevCR
5. Link attributes: the link must have the specified attributes Shortest Path Trees 48 To Be Computed An AW SPT is always computed for each profile. If the profile is CBR or rt-VBR, additional SPT's (CTD and/or CDV) are computed as specified by this parameter.

Load Balancing Flag

For a UBR or ABR profile, this flag if set indicates that load balancing is to be performed on the profile. This means that a more complicated shortest path tree 48 is to be computed for this profile that allows a different route to be produced each time the profile is selected.

Storing SPT's

Shortest path trees 48 are stored as follows: Each node has a pointer pointing to an array of pointers to profile computed data. Profile computed data contains the pointer to the parent node (i.e., the node directly upstream in the direction towards the root of the tree) and the vector of computed QoS metric for each of the trees computed.

If load-balancing is specified a more complex structure in such a metric is computed. Such a structure contains not only the backtrack-pointer to the shortest-path parent node but as well up to 2 pointers to parent nodes of the 2nd and 3rd shortest-path in the metric respectively whereas certain amount of tie-breaking is executed to prevent the computed paths from forming loops.

FIG. 5 illustrates the above discussion for a CBR profile with an AW SPT.

Route Computation Procedures

The following steps are taken when a route to one of the set of passed prefixes is requested:

1. Loop over up the profile table 40 and find the profile that matches the service category 50, QoS requirements 46 and traffic descriptors requested as follows:
   If the profile does not include the service category requested, examine the next profile
   If the profile does not meet load balancing, PVC only restrictions, examine the next profile
2. Loop over the passed prefix tree entries, find the node it belongs to and
   If the last leg (metric attached to the prefix entry) does not meet request's QoS restrictions such as CLR, CDV, bandwidth and VP capabilities of the profile, examine the next prefix
   If the node's the prefix is pointing to computed metric on any of the computed trees is fulfilling the bandwidth, CLR, CDV and CTD (together with the last leg) restrictions, then this is a hit
3. If no hits have been found and the request should be fulfilled by means of a on-demand computation then the oldest cache entry is invalidated and a tree precomputed on-demand and used as a profile.

In regard to multicast support with QoS, the necessary behavior in path computation when multicast nodes are present is achieved through the presence of lists of links which are parts of the multicast tree already. Those links are preferred over any other links on the graph for the inclusion into the computed path.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for connecting source nodes and destination nodes in an ATM network comprising the steps of:

predetermining connection profiles between source nodes and destination nodes before any of the connection profiles are requested by a connection, including creating a first connection profile having route information for connecting the first source node with the first destination node; storing the first connection profile in a profile table;

requesting a first connection from a first source node of the source nodes be formed with a first destination node of the destination nodes of the ATM network;

finding the first connection profile of the predetermined connection profiles which corresponds with the first connection; and forming the first connection between the first source node and the first destination node based on the first connection profile.

2. A method as described in claim 1 wherein the finding step includes the step of choosing the first connection profile from the profile table for route information for connecting the first source node and the first destination method.

3. A method as described in claim 2 wherein the forming step includes the step of forming the first connection between the first source node and the first destination node based on the route information in the first connection profile.

4. A method as described in claim 3 wherein the predetermining step includes the steps of creating a second connection profile having route information for connecting a second source node with a second destination node; and storing the second connection profile in the profile table.

5. A method as described in claim 4 including after the forming step, there is the step of creating a first cache profile from a connection that does not have a corresponding connection profile in the profile table.

6. A method as described in claim 5 wherein the predetermining step includes the steps of creating N additional connection profiles, where N is an integer greater than or equal to 1, having route information for connecting N source nodes with N destination nodes, respectively; and storing the N additional connection profiles in the profile table, where N≧1 and is an integer.

7. A method as described in claim 6 including after the creating a first cache profile, there are the steps of creating M additional cache profiles from M respective connections that do not have corresponding connection profiles in the profile table, where M≧1 and is an integer.

8. A method as described in claim 7 wherein the step of creating the first connection profile includes the step of creating the first connection profile having a set of parameters that described the first connection's traffic characteristics and QoS requirements.

9. A method as described in claim 8 including after the step of creating the first connection profile, there is the step of re-creating the first connection profile after a predetermined period of time.

10. A method as described in claim 9 wherein the step of creating a first connection profile includes the step of defining a shortest path tree associated with the first connection.

11. A method as described in claim 10 wherein the choosing step includes the step of searching the connection profiles and the cache profiles of the profile table for the first connection profile which satisfies the requirements of the first connection.

12. A method as described in claim 11 wherein the searching step includes the steps of determining that the first connection profile has a service category which matches the service category of the first connection; and determining that the first connection profile meets load balancing and PVC only restrictions of the first connection.

13. A method as described in claim 12 wherein the searching step includes the steps of determining that the last leg of the shortest path tree of the first connection profile meets CLR, CDV, bandwidth and VP requirements of the first connection; and determining that the remaining portions of the shortest path tree of be first connection profile meets CLR, CDV, bandwidth and CTD requirements of the first connection.

14. A method as described in claim 13 wherein the step of creating a first cache profile includes the steps of examining each of the connection profiles in the profile table and not finding that any of the connection profiles match the service category, QoS parameters and traffic descriptors of the connection;

invalidating the oldest in time cache profile of the M cache profiles; and replacing the oldest in time cache profile with a new cache profile that corresponds to the connection.

15. A system for connecting source nodes and destination nodes comprising:

an ATM network along which ATM cells travel;

source nodes connected to the ATM network which produce ATM cells that travel along the ATM network;

destination nodes connected to the ATM network which receive ATM cells from the ATM network; and a switching mechanism connected to the ATM network for directing an ATM cell from a first source node of the source nodes to a first destination node of the destination nodes, said switch mechanism having a mechanism for holding predetermined connection profiles having route information between source nodes and destination nodes which are determined before any of the connection profiles are requested by a connection, said switch mechanism connecting the first source node to the first destination node based on a desired connection profile from the holding mechanism after the first source node makes a request on the switch mechanism to be connected with the first destination node.

16. A system as described in claim 15 wherein the switch mechanism includes a switching device, which has the holding mechanism disposed on it.

17. A system as described in claim 16 wherein the holding mechanism includes a profile table in which the connection profiles are stored.

18. A system as described in claim 17 wherein the profile table includes at least a first cache profile formed from a connection that does not have a connection profile in the profile table.

19. A system as described in claim 18 wherein each connection profile includes a service category commonest QoS parameters, traffic descriptors and a shortest path tree.

* * * * *